(12) United States Patent
Zhang et al.

(10) Patent No.: US 11,972,310 B1
(45) Date of Patent: Apr. 30, 2024

(54) MULTI-RESOURCE OPERATIONS IN AN ANALYTICS COMPUTING SYSTEM

(71) Applicant: SAP SE, Walldorf (DE)

(72) Inventors: Lihua Zhang, Shanghai (CN); Wei Sun, Shanghai (CN); Xiaoxia Shen, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/097,444

(22) Filed: Jan. 16, 2023

(51) Int. Cl.
*G06F 9/54* (2006.01)
*G06F 21/44* (2013.01)

(52) U.S. Cl.
CPC .............. *G06F 9/547* (2013.01); *G06F 21/44* (2013.01)

(58) Field of Classification Search
None
See application file for complete search history.

(56) References Cited

U.S. PATENT DOCUMENTS

| | | | | |
|---|---|---|---|---|
| 10,084,785 | B2* | 9/2018 | Tsurbeleu | G06F 21/10 |
| 2015/0296026 | A1* | 10/2015 | Smyth | H04W 4/21 |
| | | | | 709/228 |
| 2020/0301678 | A1* | 9/2020 | Burman | G06F 9/541 |
| 2020/0336467 | A1* | 10/2020 | Subbarayan | H04L 67/12 |
| 2020/0348986 | A1* | 11/2020 | Venkatesh | G06F 8/36 |
| 2022/0086218 | A1* | 3/2022 | Sabella | H04M 15/66 |
| 2022/0294773 | A1* | 9/2022 | Bilger | H04L 9/3242 |

* cited by examiner

*Primary Examiner* — Atta Khan
(74) *Attorney, Agent, or Firm* — SCHWEGMAN LUNDBERG & WOESSNER, P.A.

(57) ABSTRACT

Various examples described herein are directed to systems and methods for interfacing an analytics computing system with a remote resource. An analytics computing system may access data describing a multi-resource operation. The analytics computing system may execute a multi-resource application programming interface (API) service. The multi-resource API service may send a first trigger message to a public API of the first remote resource. The analytics computing system may send first data to the remote resource and may receive, from the remote resource, first result data describing a result of the first action performed at the first remote resource using the first data.

18 Claims, 7 Drawing Sheets

MULTI-RESOURCE OPERATIONS IN AN ANALYTICS COMPUTING SYSTEM

BACKGROUND

Analytics computing systems are implemented for enterprises, such as business enterprises, to provide analysis of data. An analytics computing system may include software and/or hardware that are arranged to gather, integrate, analyze, and/or present insights regarding underlying data to various users.

BRIEF DESCRIPTION OF DRAWINGS

The present disclosure is illustrated by way of example and not limitation in the following figures.

DETAILED DESCRIPTION

An analytics computing system can be configured to perform various tasks using resources of the analytics computing system as well as remote resources implemented by other systems. Tasks performed by an analytics computing system can include, for example, providing various reports, forecasts, responses to user queries, and/or the like based on underlying resources. An example analytics computing system is the SAP® Analytics Cloud application available from SAP SE of Waldorf, Germany.

An analytics computing system may be in communication with various different remote resources. Some remote resources may be or include databases or other data stores for storing enterprise data. Also, some remote resources may provide additional functionality such as, for example, calculation engines, other specialized processing, subject matter specific data storage, and/or the like. For example, an analytics computing system, such as SAP Analytics Cloud, may utilize remote resources provided by a human capital management software solution such as SAP SuccessFactors®, also available from SAP SE of Waldorf, Germany, along with resources for project management provided by a project management software solution such as SAP Portfolio and Project Management (PaPM), also available from SAP SE of Waldorf, Germany. The analytics computing system may provide reports, forecasts, query responses, and/or the like that draw from and leverage its own resources and the remote resources.

Interfacing an analytics computing system with remote resources, however, can create challenges. For example, remote resources may have individually implemented application programming interfaces (APIs). Interfacing the analytics computing system to each individual remote resource may involve specifically configuring a connection between an API of the analytics computing system and the individual API of the remote resource. In various examples, configuring an analytics computing system to communicate with multiple remote resources may include adding a specifically configured connection service for each of the respective remote services. This can limit the usefulness of the analytics computing system functionality, for example, to business users or other users who lacked subject matter expertise in information technology (IT).

Interfacing an analytics computing system to multiple remote resources may also affect the analytics computing system user experience. For example, a business user of the analytics computing system may desire to perform an action in the analytics computing system that implicates one or more remote resources. The business user may lack sufficient expertise to handle the complications associated with configuring the connection between the API of the analytics computing system and the individual APIs of the remote resources. As a result, the business user may need to engage an administrative user, such as an IT user, to configure the connection or connections to remote resources. This may detract from the user's experience and may also increase the cost of the analytics computing system by introducing the need for additional human resources.

Various examples address these and other challenges by configuring an analytics computing system to support multi-resource operations. For example, an analytics computing system may be programmed to include a multi-resource API service. The multi-resource API service may implement connections with multiple different remote resources. In this way, an end user of the analytics computing system may request an action at a remote resource without the need to perform complex configuration of a connection between the analytics computing system and the remote resource.

In a multi-resource operation, a user may configure the analytics computing system to perform an operation that utilizes resources from the analytics computing system and at least one remote resource. When the user selects a multi-resource operation, the analytics computing system may provide the user with an interface for configuring the actions, for example, at a functional level. The analytics computing system may utilize the configuration of the actions provided by the user and the multi-resource API to execute the actions specified by the user at the analytics computing system and/or one or more of the remote resources.

Figure 1:
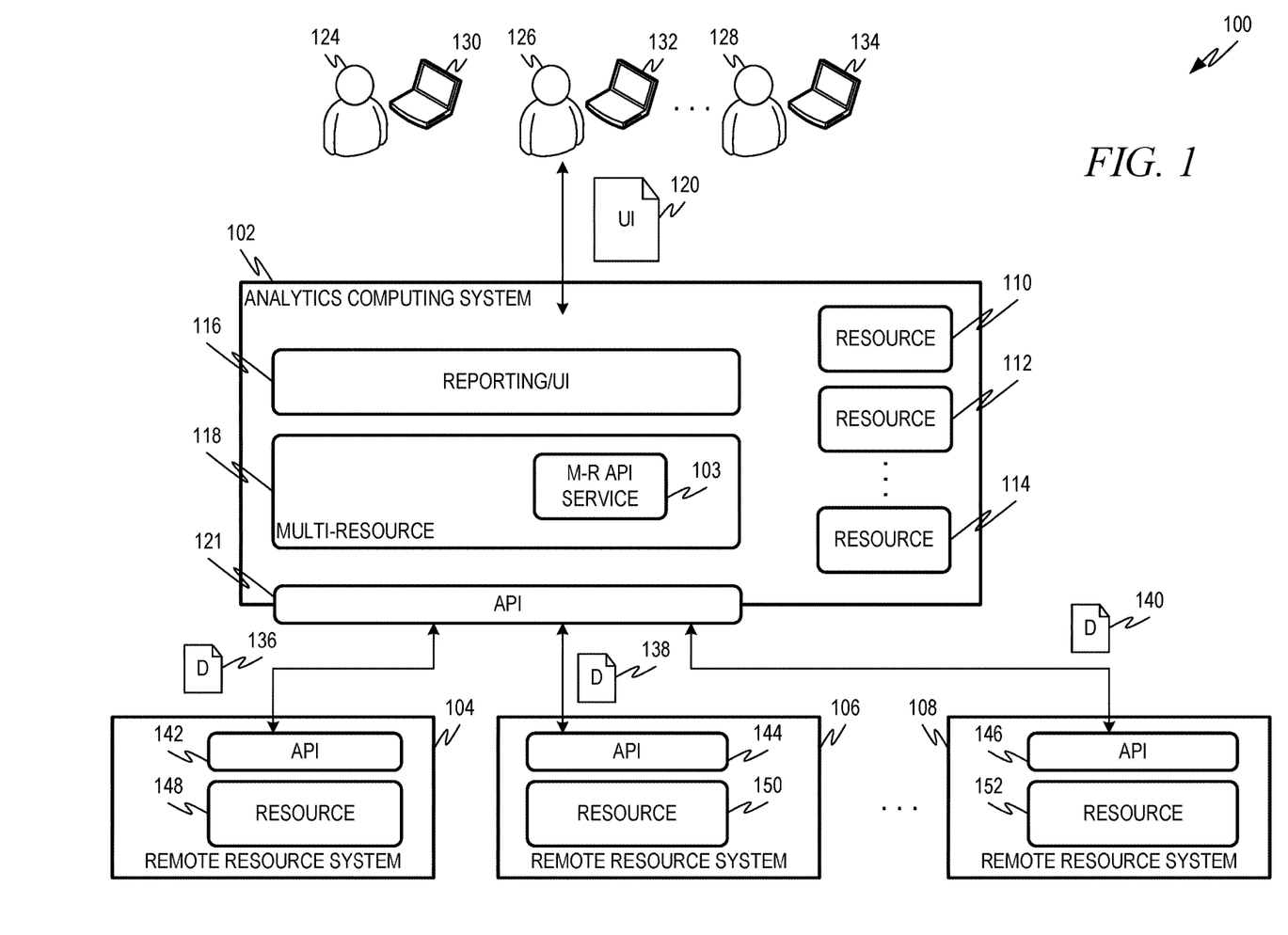
FIG. 1 is a diagram showing one example of an environment comprising an analytics computing system in communication with remote resources.

FIG. 1 is a diagram showing one example of an environment 100 comprising an analytics computing system 102 in communication with remote resources 148, 150, 152. The analytics computing system 102 comprises a multi-resource operation subsystem 118 including a multi-resource API service 103 for configuring connections with the respective remote resources 148, 150, 152. The analytics computing system 102 may also be in communication with one or more users 124, 126, 128 associated with an enterprise implementing and/or using the analytics computing system 102.

The analytics computing system 102 can be configured to perform various tasks using analytics computing system 102 resources such as, for example, local resources 110, 112, 114 and/or remote resources 148, 150, 152. Tasks performed by an analytics computing system 102 can include, for example, providing various reports, forecasts, responses to user queries, and/or the like based on underlying resources. An example analytics computing system 102 is the SAP® Analytics Cloud available from SAP SE of Waldorf, Germany.

In some examples, the analytics computing system 102 is implemented in an on-premise environment. For example, an enterprise utilizing the analytics computing system 102 may maintain an on-premise computing system. The analytics computing system 102 may be implemented by executing appropriate software at the on-premise computing system. Users 124, 126, 128 associated with the enterprise may access the analytics computing system 102 by accessing the on-premise computing system.

In some examples, the analytics computing system 102 is implemented in a cloud environment. For example, the analytics computing system 102 may be implemented in a public cloud environment or in a private cloud environment. In a private cloud environment, the enterprise may provide applications, implement storage, and the like, to implement the analytics computing system 102. Executables and/or other software for implementing the analytics computing system 102 at the private cloud environment may be provided, for example, by a software provider. Users 124, 126, 128 of the enterprise may access the analytics computing system 102 at the private cloud environment, for example, to request, configure, and/or consume the analytics reports and/or other outputs of the analytics computing system 102.

In a public cloud environment, a cloud environment is arranged into a number of tenancies implemented by a cloud service provider. The cloud service provider may provide one or more executables or other components to implement the analytics computing system 102 at the public cloud environment. An enterprise using the analytics computing system 102 may hold one or more tenancies, allowing users 124, 126, 128 associated with the enterprise to access one or more instances of the analytics computing system 102 at the public cloud environment to consume analytics reports, query responses, and/or other outputs of the analytics computing system 102.

The analytics computing system 102 may utilize various resources including, for example, internal resources 110, 112, 114 and/or remote resources 148, 150, 152. Internal resources 110, 112, 114 may include resources that are implemented as components of the analytics computing system 102. Internal resources 110, 112, 114 may include, for example, various data models, various machine learning models, various calculation engines, various data storage resources, and/or the like.

Remote resources 148, 150, 152 may include various data models, machine learning models, calculation engines, data storage resources, and/or the like. For example, some remote resources may be or include a database management systems or other data storage arrangements. Examples of remote resources 148, 150, 152 including data storage arrangements include S/4 HANA™, available from SAP SE of Waldorf, Germany, SAP Data Warehouse Cloud, also available from SAP SE of Waldorf, Germany. Other examples of remote resources 148, 150, 152 including data storage arrangements include SQL database services such as, for example, BigQuery® available from Google, LLC of Mountain View, California, Sharepoint® available from Microsoft Corporation of Redmond, Washington, various data storage products available from Salesforce, Inc. of San Francisco, California, and/or the like.

Some remote resources 148, 150, 152 may include software solutions, such as, software solutions directed to a particular task. One example remote resource 148, 150, 152 may be a human resources management software solution, such as the SAP SuccessFactors® software solution available from SAP SE of Waldorf, Germany. Another example remote resource 148, 150, 152 may be an expense management software solution, such as SAP Concur®, available from SAP SE of Waldorf, Germany. Yet another example remote resource 148, 150, 152 may be a project management software solution, such as SAP PaPM, also available from SAP SE of Waldorf, Germany.

Remote resources 148, 150, 152 may be implemented at remote resource systems 104, 106, 108. The remote resource systems 104, 106, 108 may be or include on-premise computing systems, public cloud environments, private cloud environments, and/or the like. Remote resource systems 104, 106, 108 may host respective remote resources 148, 150, 152 and respective public APIs 142, 144, 146. The analytics computing system 102 may utilize the respective public APIs 142, 144, 146 to provide data 136, 138, 140 to, and receive data 136, 138, 140 from, the respective remote resources 148, 150, 152.

Users 124, 126, 128 may be associated with the enterprise utilizing the analytics computing system 102. The users 124, 126, 128 may access the analytics computing system 102 utilizing user computing devices 130, 132, 134. User computing devices 130, 132, 134 may be or include various different types of computing devices such as, for example, desktop computers, laptop computers, tablet computers, mobile computing devices, and/or the like.

The analytics computing system 102 may also comprise a reporting/user interface (UI) subsystem 116. The reporting/UI subsystem 116 may generate a UI 120 and serve the UI 120 to one or more of the users 124, 126, 128. The users 124, 126, 128 may receive and interact with the UI 120 via the respective user computing devices 130, 132, 134.

The UI 120 may provide users 124, 126, 128 with results generated by the analytics computing system 102. The results may be based on the use of one or more of the internal resources 110, 112, 114 and/or remote resources 148, 150, 152. The UI 120, in some examples, may also include features that can be used by the users 124, 126, 128 to request a multi-resource operation.

In a multi-resource operation, the analytics computing system 102 performs an operation that includes actions at multiple remote resources 148, 150, 152. Consider an example in which a user 124 desires to create a new employment position. Such an operation may implicate multiple resources of the analytics computing system 102. For example, a new employment position may have an impact on human resource-related issues such as, for example, payroll, benefits, and/or the like. Accordingly, creating a new employment position may involve accounting for the new position at a remote resource 148, 150, 152 that is or includes a human resources software solution. Also, creating the new employment position may have an impact on expenses including, for example, travel-related expenses. Accordingly, creating a new employment position may involve accounting for the new position at a remote resource 148, 150, 152 that is or includes an expense management software solution. Further, creating the new employment position may have an impact on the progress of various projects undertaken by the enterprise. Accordingly, creating a new employment position may involve accounting for the new position at a remote resource 148, 150, 152 that is or includes a project management software solution. It will be appreciated that, in various examples, creating a new employment position may implicate additional remote resources beyond what is described here. In various examples, the analytics computing system 102 may be configured to support a request from a user 124, 126, 128 to create an employment position by executing a multi-resource operation. For example, the multi-resource operation may include configuring the new employment position by providing data to and/or receiving data from remote resources 148, 150, 152 such as a human resources software solution, an expense software solution, a project planning software solution, and/or the like.

In some examples, the analytics computing system 102 is configured to operate with a remote resource 148, 150, 152 that has a component that the analytics computing system 102 lacks and/or has a component that is better suited to a particular action than the corresponding internal resource 110, 112, 114. Consider an example in which one of the remote resources 148, 150, 152 is and/or comprises a calculation engine having capabilities superior to the capabilities of the corresponding calculation engine at the internal resources 110, 112, 114 of the analytics computing system 102. In this example, the analytics computing system 102 may be configured to execute a multi-resource action that retrieves data 136, 138, 140 for a calculation, provides the data 136, 138, 140 to the appropriate remote resource system 104, 106, 108, and receives a result of the calculation performed on the data 136, 138, 140 by the relevant remote resource 148, 150, 152.

To execute a multi-resource operation, the multi-resource subsystem 118 (e.g., the multi-resource API service 103 thereof) may access connection data describing a connection to a first remote resource 148, 150, 152. The connection data may comprise, for example, a Universal Resource Locator (URL) or other suitable identifier of a public API 142, 144, 146 associated with the first remote resource 148, 150, 152. In some examples, the connection data also comprises security data. Security data may include data that is used to authenticate the analytics computing system to the public API 142, 144, 146 of a selected remote resource system 104, 106, 108. In some examples, the security data may include a user name and a password. Also, in some examples, the security data may include a client identifier identifying the analytics computing system 102 and a client secret associated with the analytics computing system 102. Further, in some examples, the security data may include a token previously issued to the analytics computing system 102 by the relevant remote resource system 104, 106, 108, and/or by an authorization server, for example, as described herein. In some examples, the security data is arranged according to a protocol such as, for example, the OAuth protocol.

In some examples, the multi-resource API service 103 may utilize connection data for a remote resource system 104, 106, 108 to send a trigger message to the public API 142, 144, 146 of a relevant remote resource system 104, 106, 108, for example, via a data export API 121 of the analytics computing system 102. The trigger message may comprise a description of an action of the multi-resource operation that is to be performed by a remote resource 148, 150, 152 at the respective remote resource system 104, 106, 108. The trigger message may prompt the relevant remote resource system 104, 106, 108 and public API 142, 144, 146 thereof to prepare to perform the described action. For example, the relevant remote resource system and/or public API 142, 144, 146 thereof may be configured to receive data 136, 138, 140 as input and/or provide data 136, 138, 140 as an output, depending on the nature of the requested action. After the trigger message has been sent, the multi-resource subsystem 118 may provide data 136, 138, 140 to the relevant remote resource system 104, 106, 108 and/or receive data 136, 138, 140 from the relevant remote resource system 104, 106, 108 so as to complete the multi-resource operation.

In some examples, when a multi-resource operation utilizes more than one remote resource 148, 150, 152, the multi-resource API service 103 may be configured to access connection data for each remote resource system 104, 106, 108 comprising a remote resource 148, 150, 152 that is to execute an action according to the multi-resource operation.

The multi-resource subsystem 118 may manage the execution of a multi-resource operation. For example, the multi-resource subsystem 118 may utilize the data export API 121 to provide data 136, 138, 140 to and/or receive data 136, 138, 140 from a relevant remote resource system or systems 104, 106, 108.

Figure 2:
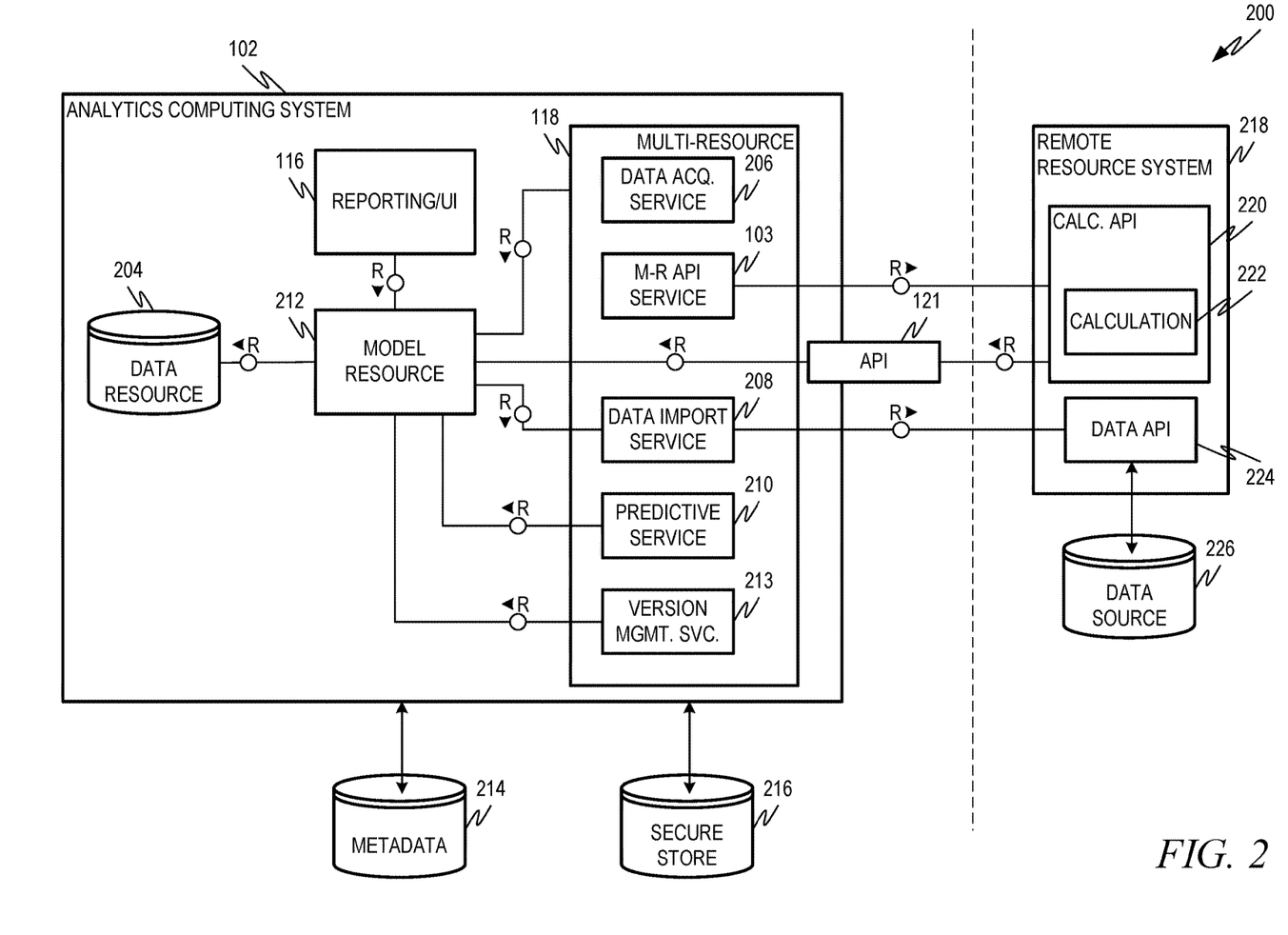
FIG. 2 is a diagram showing one example of an environment including the analytics computing system and demonstrating additional aspects of a multi-resource operation.

FIG. 2 is a diagram showing one example of an environment 200 including the analytics computing system 102 and demonstrating additional aspects of a multi-resource operation. In the example of FIG. 2, the analytics computing system 102 comprises the reporting/UI subsystem 116 and the multi-resource subsystem 118 including the multi-resource API service 103. Additionally, the multi-resource subsystem 118 includes a data acquisition service 206, a data import service 208, a predictive service 210, and a version management service 213.

In the example of FIG. 2, the analytics computing system 102 is executing a multi-resource operation utilizing internal resources, including an internal data resource 204 and an internal model resource 212, as well as a remote resource including a remote calculation engine 222. In this example, the model resource 212 may be a model for performing a calculation or calculations on data received from the data resource 204 and/or from a different resource of the analytics computing system 102. The model resource 212 may be in communication with the reporting/UI subsystem 116 to receive input from and/or provide results to a user 124, 126, 128 via the UI 120.

The example multi-resource operation illustrated by FIG. 2 includes an arrangement in which a calculation associated with the model resource 212 is performed by the remote calculation engine 222. The model resource 212 may access data from the data resource 204 and prepare the data for the operation to be performed by the remote calculation engine 222. For example, the model resource 212 may perform preliminary processing on the data.

The multi-resource subsystem 118 may handle the configuring of a connection between the analytics computing system 102 and the remote resource system 218 hosting the remote calculation engine 222. The multi-resource subsystem 118 also handle the transfer of input data to the remote resource system 218 as well as the receipt of output data from the remote resource system 218. The output data may represent the result of the calculation performed by the remote calculation engine 222. The output data may be provided back to the model resource 212, which may continue with processing based on the output data.

The model resource 212 may be in communication with the multi-resource subsystem 118. When the model resource 212 reaches a point in its processing in which it is ready for the action to be performed by the remote calculation engine 222, it may prompt the multi-resource subsystem 118.

The multi-resource API service 103 may prepare a connection between the analytics computing system 102 and the remote resource system 218. For example, the multi-resource API service 103 may access connection data describing a connection with the remote resource system 218 hosting the remote calculation engine 222. In some examples, the multi-resource API service 103 may query the data acquisition service 206 to obtain the connection data. The data acquisition service 206 may query a metadata store 214 and/or a secured data store 216 to obtain the connection data.

The data acquisition service 206 may query the metadata store 214 to obtain connection data such as, for example, a URL or other identifier of the remote resource system 218 or an API or APIs 220, 224 thereof, a transfer method for communicating with the API or APIs 220, 224, header fields or other data describing the arrangement of messages sent to the API or APIs 220, 224 of the remote resource system 218, and/or the like. In some examples, the multi-resource API service 103 may be configured to communicate with the APIs 220, 224 of the remote resource system 218 according to a protocol such as HyperText Transfer Protocol (HTTP). In these examples, the connection data stored at the metadata store 214 may include an HTTP method of transfer such as POST or GET, specific HTTP header field values, specific HTTP body formats, and/or the like.

The data acquisition service 206 may query the secure data store 216 to obtain security data associated with the remote resource system 218. The security data may include data for authenticating the analytics computing system to the remote resource system 218. In some examples, the security data includes a user name and a password. Also, in some examples, as described herein, the security data may be arranged according to an authorization protocol such as the OAuth protocol. For example, the security data may include a client identifier describing the analytics computing system 102 and a client secret associated with the analytics computing system 102. Also, in some examples, the security data may include token data describing a token indicating an authentication of the analytics computing system 102. The token may have been received from an authorization server, for example, as described herein.

The multi-resource API service 103 may utilize the connection data received from the data acquisition service 206 to send a trigger message to the remote resource system 218 (e.g., a calculation public API 220 thereof). The trigger message may prompt the remote resource system 218 to expose features of the remote calculation engine 222 that are to be used to perform the action at the remote calculation engine 222. For example, the trigger message may prompt the remote resource system 218 to expose functionality for receiving input data at the calculation public API 220, to perform the desired action at the remote calculation engine 222, and/or to return result data via the calculation public API 220 and/or via a public data API 224 of the remote resource system 218. In some examples, the remote calculation engine 222 may utilize a remote resource system data store 226. The data store 226 may store data used by the remote calculation engine 222 and/or may store the result data before it is returned to the analytics computing system 102 via the data import service 208.

After the trigger message is sent, the model resource 212 may send the input data to the calculation public API 220 of the remote resource system 218 via a data export API 121 of the analytics computing system 102. The calculation public API 220 and remote calculation engine 222 may be prepared to receive the input data in response to the trigger message.

Upon receiving the input data, the remote calculation engine 222 may perform the action that was indicated by the trigger message. The action may return result data. The remote resource system 218 may be configured to provide the result data to the analytics computing system 102 via a public data API 224. A data import service 208 of the multi-resource subsystem 118 may receive the result data. In some examples, the data import service 208 may perform pre-processing on the result data such as, for example, performing various integrity checks, formatting the data in a format recognized by the model resource 212, and/or the like. The data import service 208 may provide the pre-processed result data to the model resource 212. The model resource 212 may incorporate the received result data into its further processing.

In the example of FIG. 2, the multi-resource subsystem 118 also includes a predictive service 210 and a version management service 213. The predictive service 210 may execute one or more machine learning models trained to receive a time-series data set and project or forecast that data set into the future. For example, the predictive service 210 may provide the model resource 212 with a projection of data values from the input data and/or the result data. The version management service 213 may be utilized, for example, by the data acquisition service 206, to retrieve connection data that corresponds to a correct version of the remote calculation engine 222 and/or other components of the remote resource system 218.

Figure 3:
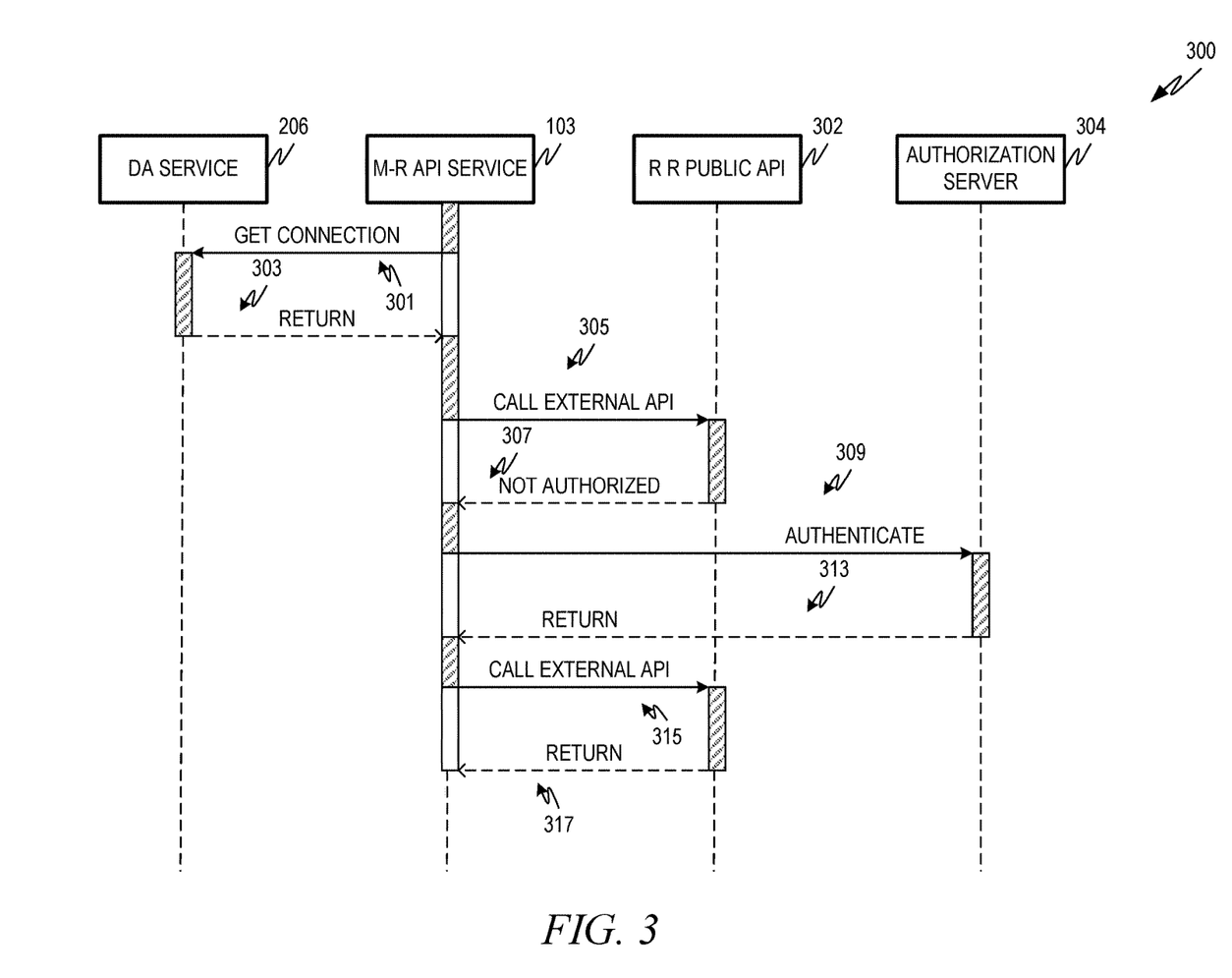
FIG. 3 is a swim lane diagram illustrating a process flow to configure a connection between the analytics computing system and a remote resource.

FIG. 3 is a swim lane diagram 300 illustrating a process flow that may be executed in the environments 100 and/or 200 to configure a connection between the analytics computing system 102 and a remote resource. The swim lane diagram 300 comprises the multi-resource API service 103 and data acquisition service 206. The swim lane diagram 300 also comprises a remote resource public API 302 and an authorization server 304. The remote resource public API 302 may be an API at a remote resource system that is associated with a remote resource. For example, referring to FIG. 2, the remote resource public API 302 may be similar to the calculation API 220.

The process illustrated by the swim lane diagram 300 may begin when the multi-resource API service 103 is prompted to initiate an action at a remote resource. The multi-resource API service 103 may send a request 301 for connection data for connecting to the remote resource public API 302. The data acquisition service 206 may obtain the connection data from a metadata store such as the metadata store 214 and/or from a secured data store, such as the secure data store 216. The connection data, as described herein, may include security data for authenticating the analytics computing system 102 to the remote resource system. In this example, the security data comprises token data indicating the identity of the analytics computing system 102. The data acquisition service 206 sends a return message 303 including the connection data.

The multi-resource API service 103 may use the connection data, including token data, to send a trigger message 305 to the remote resource public API 302. In this example arrangement, the token data may be expired. Accordingly, the remote resource public API 302 may send a return message 307 indicating that the trigger message 305 is not authorized. In response to receiving the return message 307, the multi-resource API service 103 may send an authentication message 309 to an authentication server 304. The authentication server 304 may be associated with any suitable authentication service. In some examples, the authentication message 309 includes the client identifier and client secret received from the data acquisition service 206 at the return message 303. In other examples (not shown in FIG. 3), the multi-resource API service 103 may prompt the data acquisition service 206 for the client secret and client identifier data after receiving the message 307 rejecting the initial trigger message 305.

The authorization server 304 may authenticate the analytics computing system 102 based on the authentication message 309. Upon authenticating the analytics computing system 102, the authorization server 304 may send a return message 313 to the multi-resource API service 103. The return message 313 may comprise updated token data.

The multi-resource API service 103 may use the updated token data to send a second trigger message 315 to the remote resource public API 302. The second trigger message 315 may include the token data received from the authorization server 304 with the return message 313. Based on the now-updated token data, the remote resource public API 302 may send a return message 317 to the multi-resource API service 103. The return message 317 may indicate a response to the trigger message. In some examples, the return message 317 may indicate that the remote resource system associated with the remote resource public API 302 is configured to expose functionality for performing a portion of a multi-resource operation described by the second trigger message 315.

Figure 4:
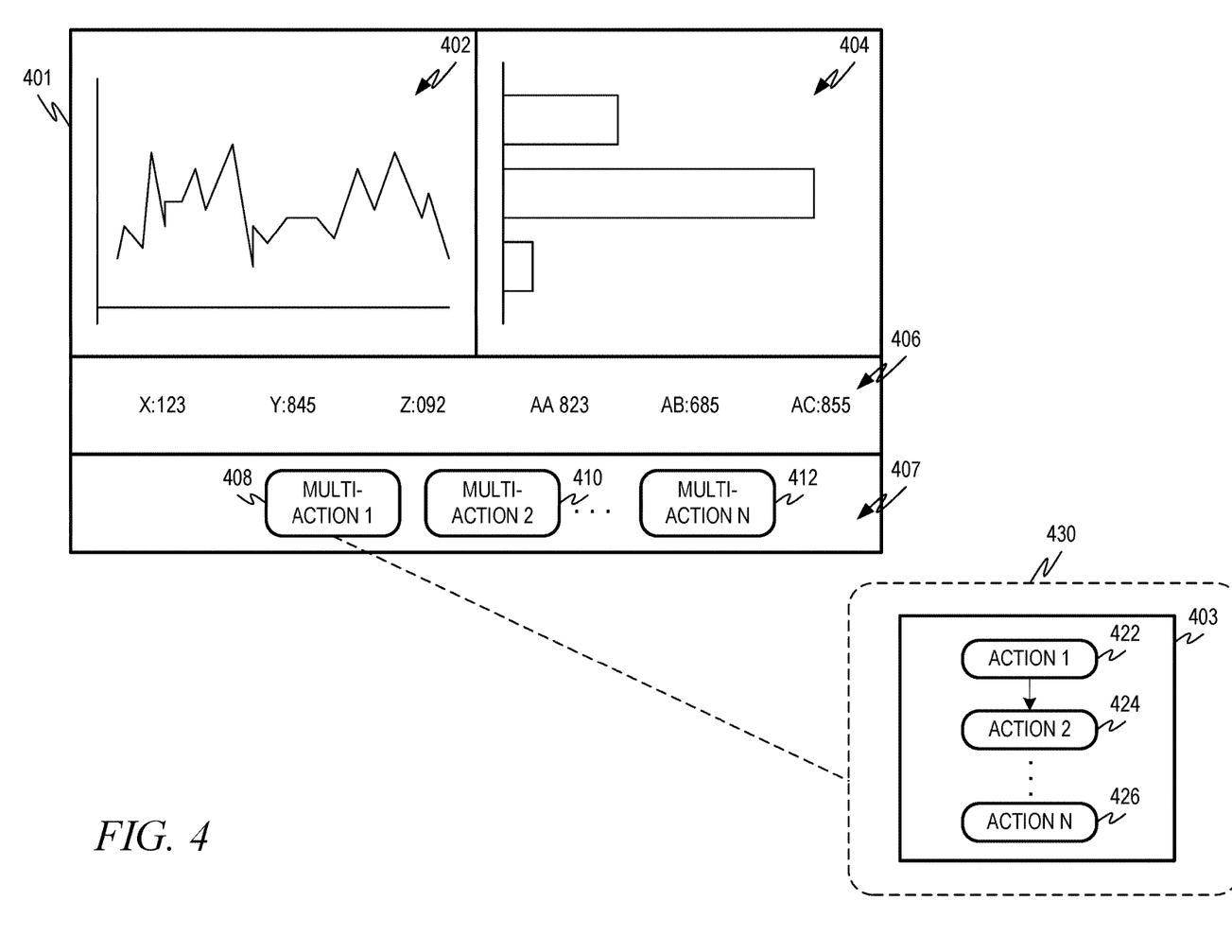
FIG. 4 is a diagram showing example screens from the user interface of FIG. 1.

FIG. 4 is a diagram showing example screens 401, 403 from the user interface 120. The screen 401 may be a dashboard or summary screen providing results of various operations at the analytics computing system 102. The screen 401 may be served to a user computing device 130, 132, 134. The screen 401 includes various fields 402, 404, 406, 407 that include outputs at the analytics computing system 102. In this example, the field 402 includes a line graph illustrating data that is the result of at least one operation or calculation at the analytics computing system 102. The field 404 shows a bar graph illustrating data that is the result of at least one operation or calculation at the analytics computing system 102. The field 406 includes numerical values illustrating the results of at least one calculation or operation at the analytics computing system 102.

The field 407 includes various multi-action buttons 408, 410, 412. The multi-action buttons 408, 410, 412 may be selected by a user 124, 126, 128 to prompt the analytics computing system 102 to execute a multi-resource action. Multi-action buttons 408, 410, 412 are illustrated as buttons that may be selected by a user 124, 126, 128 using a pointing device and cursor and/or a touch screen of the respective user computing devices 130, 132, 134. It will be appreciated that in various examples, however, multi-action buttons 408, 410, 412 may be implemented using various other types of user interface elements that are selectable by a user 124, 126, 128.

In some examples, the UI 120 may respond to the selection of one of the multi-action buttons 408, 410, 412 by providing a multi-resource operation configuration screen. FIG. 4 includes a breakout window 430 showing an example multi-resource operation configuration screen 403 that may be displayed at the UI 120 when the user selects multi-action button 408. The multi-resource operation configuration screen 403 includes action icons 422, 424, 426. Each action icon 422, 424, 426 may correspond to an action of the multi-resource operation. Different actions may be performed using different resources of the analytics computing system 102 including, for example, remote resources, as described herein. The user 124, 126, 128 may configure the multi-resource operation by selecting and positioning the action icons 422, 424, 426. The multi-resource subsystem 118 may be configured to interpret the sequence of actions provided by the user 124, 126, 128 to generate appropriate connections to remote resource systems, and transfer data as indicated.

Figure 5:
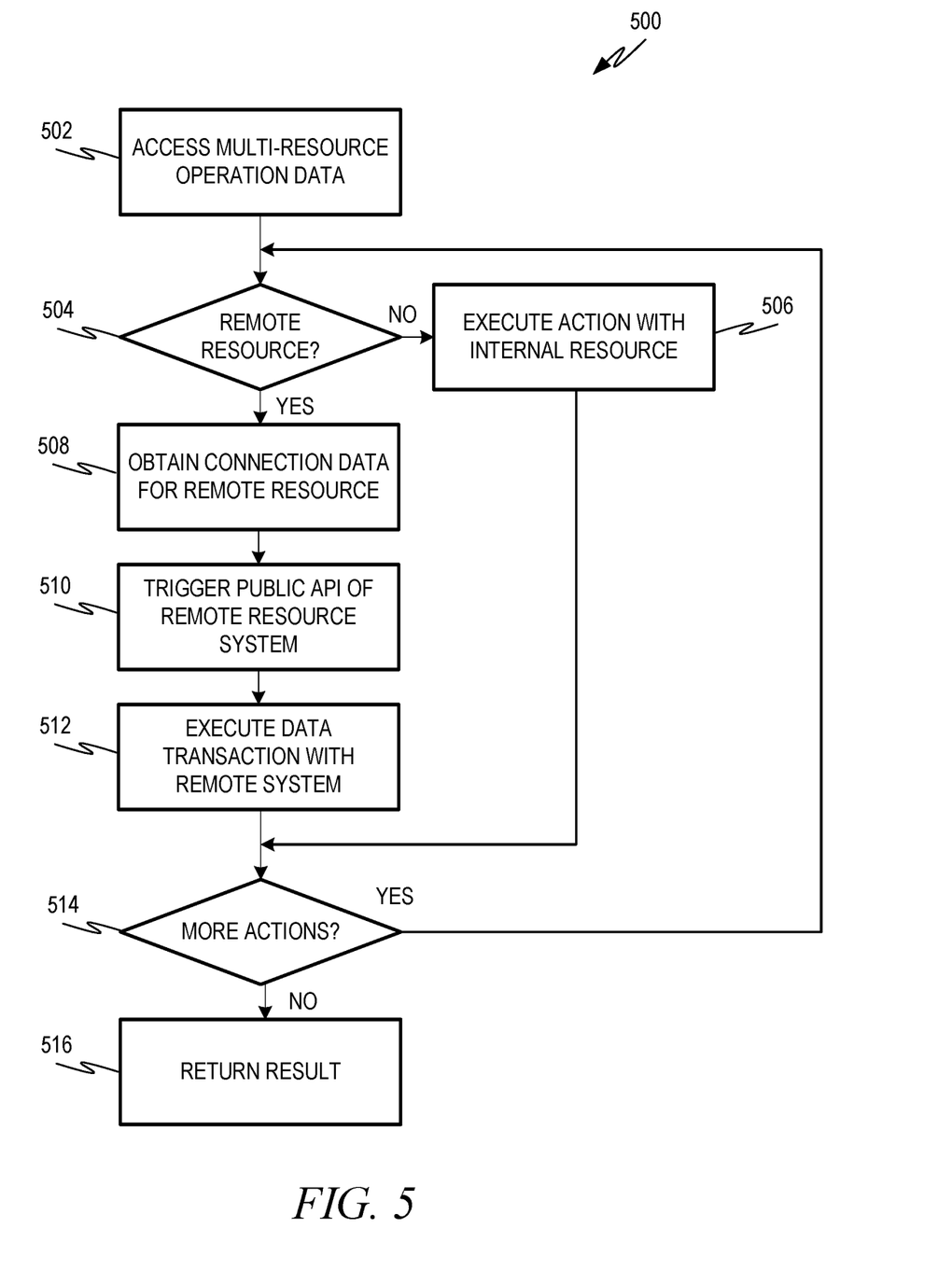
FIG. 5 is a flowchart showing one example of a process flow that may be executed by the analytics computing system to execute a multi-resource operation.

FIG. 5 is a flowchart showing one example of a process flow 500 that may be executed by the analytics computing system 102 to execute a multi-resource operation. At operation 502, the analytics computing system 102 may access multi-resource operation data describing a multi-resource operation to be executed at the analytics computing system 102. In various examples, the multi-resource operation data is generated in response to input from a user 124, 126, 128 via the UI 120. For example, the multi-resource operation data may have been generated using UI screens similar to the UI screens 401 and 403 described with respect to FIG. 4.

At operation 504, the analytics computing system 102 may determine whether the first action described by the multi-resource operation data is to be performed with a remote resource, such as one of remote resources 148, 150, 152, or with an internal resource, such as one of internal resources 110, 112, 114. If the action is to be performed with an internal resource, the analytics computing system 102 may execute the action with the internal resource at operation 506.

If the operation is to be performed with a remote resource, then the analytics computing system 102 may, at operation 508, access connection data for the remote resource that is to perform the action. For example, the multi-resource API service 103 may obtain the connection data, as described herein. The connection data may include identifying information that identifies a public API at the remote resource system hosting the remote resource and security information for authenticating or proving the authentication of the analytics computing system 102 to the remote resource system.

At operation 510, the multi-resource API service 103 may send a trigger message to a public API of the remote resource system hosting the remote resource. The trigger message, as described herein, may prompt the public API of the remote resource system hosting the remote resource to expose functionality for performing the action. At operation 512, the analytics computing system 102 may execute a data transaction with the remote resource system hosting the remote resource. This may include sending input data to the remote resource system. In some examples, it may also include receiving result data from the remote resource system. The result data may indicate a result of the action performed by the remote resource at the remote resource system. In some examples, the result data may be or include an indication that the remote resource has completed the action.

After executing the data transaction with the remote system at operation 512, or after executing the action with the internal resource at operation 506, the analytics computing system may determine, at operation 514, whether there any additional actions in the multi-resource operation. If there are additional actions, then the analytics computing system 102 may return to operation 504 to determine if a next action is to be performed with a remote resource or with an internal resource. If there are no additional actions, the analytics computing system 102 may return a result of the multi-resource operation at operation 516.

EXAMPLES

Example 1 is an analytics computing system comprising: at least one processor programmed to perform operations comprising: receiving, from a user computing device, data describing a multi-resource operation, the multi-resource operation comprising a first action associated with a first remote resource and a second action associated with a second remote resource; executing a multi-resource application programming interface (API) service; sending, by the multi-resource API service, a first trigger message to a public API of the first remote resource, the first trigger message describing the first action; sending, to the first remote resource, first data, the first data being sent via the public API of the first remote resource; receiving, from the first remote resource, first result data describing a result of the first action performed at the first remote resource using the first data; initiating, by the multi-resource API service, a second connection with the second remote resource; sending, by the multi-resource API service, a second trigger message to a public API of the second remote resource, the second trigger message describing a second action; and sending, to the second remote resource, second data associated with the second action, the second data being sent via the public API of the second remote resource.

In Example 2, the subject matter of Example 1 optionally includes the operations further comprising accessing, by the multi-resource API service, first connection data for the first remote resource, the first connection data comprising first address data describing an address of a public API of the first remote resource, and first security data, the sending of the first trigger message being based at least in part on the first connection data and the first security data.

In Example 3, the subject matter of any one or more of Examples 1-2 optionally includes the operations further comprising: accessing, by the multi-resource API service, security data associated with the first remote resource; sending an authorization message to an authorization server, the authorization message based at least in part on the security data associated with the first remote resource; and receiving, from an authentication server, token data associated with the first remote resource, the first trigger message comprising the token data.

In Example 4, the subject matter of Example 3 optionally includes the operations further comprising: before sending the authorization message to the authorization server, sending, by the multi-resource API service, an initial trigger message to the public API of the first remote resource, the initial trigger message comprising a stored token data received with the security data; and receiving, from the public API of the first remote resource, a rejection message indicating that the stored token data is not accepted.

In Example 5, the subject matter of any one or more of Examples 1-4 optionally includes the operations further comprising serving a user interface screen, by the analytics computing system and to the user computing device, the user interface screen comprising at least one result field and a multi-resource operation input, the multi-resource operation input being selectable by a user to instruct the analytics computing system to execute the multi-resource operation.

In Example 6, the subject matter of Example 5 optionally includes the operations further comprising: receiving an indication that a user associated with the user computing device has selected the multi-resource operation input; serving, to the user computing device, a multi-action operation configuration screen the multi-action operation configuration screen comprising at least one input field for receiving multi-action operation description data from the user; and receiving, from the user computing device, the multi-action operation description data via the at least one input field, at least one of the first action and the second action being based at least in part on the multi-action operation description data.

In Example 7, the subject matter of any one or more of Examples 1-6 optionally includes the first remote resource comprising a calculation engine and the first action comprising an operation performed on the first data using the calculation engine.

In Example 8, the subject matter of any one or more of Examples 1-7 optionally includes the second action comprising storing the second data at the second remote resource.

In Example 9, the subject matter of any one or more of Examples 1-8 optionally includes the sending of the first data to the first remote resource comprising calling, by the multi-resource API service, a data export API executing at the analytics computing system, the data export API to send the first data to the first remote resource via the public API of the first remote resource.

Example 10 is a method for interfacing an analytics computing system with a remote resource, the method comprising: receiving, by the analytics computing system and from a user computing device, data describing a multi-resource operation, the multi-resource operation comprising a first action associated with a first remote resource and a second action associated with a second remote resource; executing, by the analytics computing system, a multi-resource application programming interface (API) service; sending, by the multi-resource API service, a first trigger message to a public API of the first remote resource, the first trigger message describing the first action; sending, by the analytics computing system and to the first remote resource, first data, the first data being sent via the public API of the first remote resource; receiving, by the analytics computing system and from the first remote resource, first result data describing a result of the first action performed at the first remote resource using the first data; initiating, by the multi-resource API service, a second connection with the second remote resource; sending, by the multi-resource API service, a second trigger message to a public API of the second remote resource, the second trigger message describing a second action; and sending, by the analytics computing system and to the second remote resource, second data associated with the second action, the second data being sent via the public API of the second remote resource.

In Example 11, the subject matter of Example 10 optionally includes the operations further comprising accessing, by the multi-resource API service, first connection data for the first remote resource, the first connection data comprising first address data describing an address of a public API of the first remote resource, and first security data, the sending of the first trigger message being based at least in part on the first connection data and the first security data.

In Example 12, the subject matter of any one or more of Examples 10-11 optionally includes accessing, by the multi-resource API service, security data associated with the first remote resource; sending an authorization message to an authorization server, the authorization message based at least in part on the security data associated with the first remote resource; and receiving, from an authentication server, token data associated with the first remote resource, the first trigger message comprising the token data.

In Example 13, the subject matter of Example 12 optionally includes before sending the authorization message to the authorization server, sending, by the multi-resource API service, an initial trigger message to the public API of the first remote resource, the initial trigger message comprising a stored token data received with the security data; and receiving, from the public API of the first remote resource, a rejection message indicating that the stored token data is not accepted.

In Example 14, the subject matter of any one or more of Examples 10-13 optionally includes serving a user interface screen, by the analytics computing system and to the user computing device, the user interface screen comprising at least one result field and a multi-resource operation input, the multi-resource operation input being selectable by a user to instruct the analytics computing system to execute the multi-resource operation.

In Example 15, the subject matter of Example 14 optionally includes receiving, by the analytics computing system, an indication that a user associated with the user computing device has selected the multi-resource operation input; serving, by the analytics computing system and to the user computing device, a multi-action operation configuration screen the multi-action operation configuration screen comprising at least one input field for receiving multi-action operation description data from the user; and receiving, by the analytics computing system and from the user computing device, the multi-action operation description data via the at least one input field, at least one of the first action and the second action being based at least in part on the multi-action operation description data.

In Example 16, the subject matter of any one or more of Examples 10-15 optionally includes the first remote resource comprising a calculation engine and the first action comprising an operation performed on the first data using the calculation engine.

In Example 17, the subject matter of any one or more of Examples 10-16 optionally includes the second action comprising storing the second data at the second remote resource.

In Example 18, the subject matter of any one or more of Examples 10-17 optionally includes the sending of the first data to the first remote resource comprising calling, by the multi-resource API service, a data export API executing at the analytics computing system, the data export API to send the first data to the first remote resource via the public API of the first remote resource.

Example 19 is a non-transitory machine-readable medium comprising instructions thereon that, when executed by at least one processor, cause the at least one processor to perform operations comprising: receiving, from a user computing device, data describing a multi-resource operation, the multi-resource operation comprising a first action associated with a first remote resource and a second action associated with a second remote resource; executing a multi-resource application programming interface (API) service; sending, by the multi-resource API service, a first trigger message to a public API of the first remote resource, the first trigger message describing the first action; sending, to the first remote resource, first data, the first data being sent via the public API of the first remote resource; receiving, from the first remote resource, first result data describing a result of the first action performed at the first remote resource using the first data; initiating, by the multi-resource API service, a second connection with the second remote resource; sending, by the multi-resource API service, a second trigger message to a public API of the second remote resource, the second trigger message describing a second action; and sending, to the second remote resource, second data associated with the second action, the second data being sent via the public API of the second remote resource.

In Example 20, the subject matter of Example 19 optionally includes the operations further comprising accessing, by the multi-resource API service, first connection data for the first remote resource, the first connection data comprising first address data describing an address of a public API of the first remote resource, and first security data, the sending of the first trigger message being based at least in part on the first connection data and the first security data.

Figure 6:
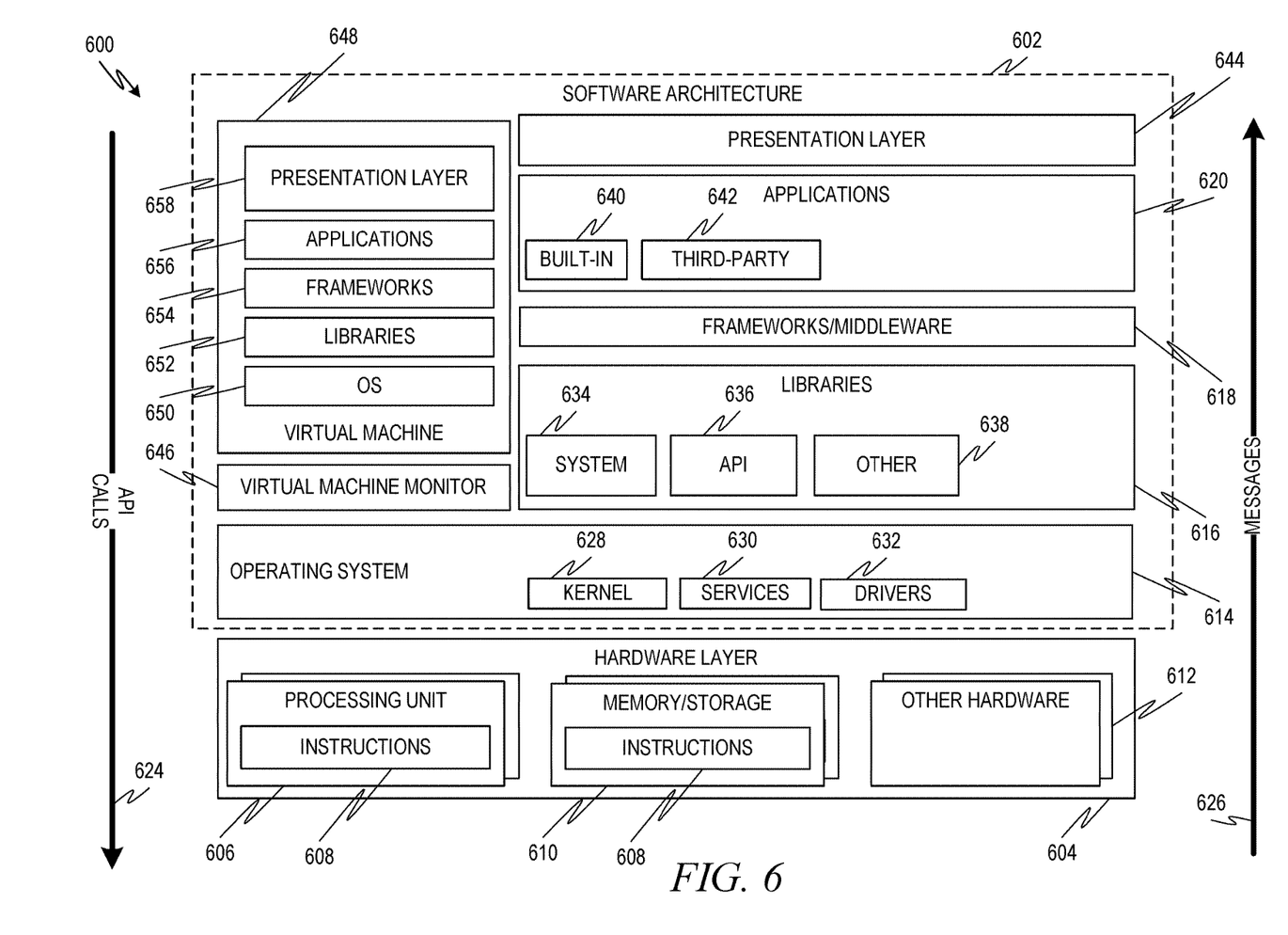
FIG. 6 is a block diagram showing one example of an architecture for a computing device.

FIG. 6 is a block diagram 600 showing one example of a software architecture 602 for a computing device. The architecture 602 may be used in conjunction with various hardware architectures, for example, as described herein. FIG. 6 is merely a non-limiting example of a software architecture and many other architectures may be implemented to facilitate the functionality described herein. A representative hardware layer 604 is illustrated and can represent, for example, any of the above referenced computing devices. In some examples, the hardware layer 604 may be implemented according to the architecture of the computer system of FIG. 7.

The representative hardware layer 604 comprises one or more processing units 606 having associated executable instructions 608. Executable instructions 608 represent the executable instructions of the software architecture 602, including implementation of the methods, modules, subsystems, and components, and so forth described herein, and may also include memory and/or storage modules 610, which also have executable instructions 608. Hardware layer 604 may also comprise other hardware as indicated by other hardware 612 which represents any other hardware of the hardware layer 604, such as the other hardware illustrated as part of the architecture 602.

In the example architecture of FIG. 6, the software architecture 602 may be conceptualized as a stack of layers where each layer provides particular functionality. For example, the software architecture 602 may include layers such as an operating system 614, libraries 616, middleware layer 618, applications 620, and presentation layer 644. Operationally, the applications 620 and/or other components within the layers may invoke API calls 624 through the software stack and access a response, returned values, and so forth illustrated as messages 626 in response to the API calls 624. The layers illustrated are representative in nature and not all software architectures have all layers. For example, some mobile or special purpose operating systems may not provide a middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. In some examples, the services 630 include an interrupt service. The interrupt service may detect the receipt of an interrupt and, in response, cause the architecture 602 to pause its current processing and execute an interrupt service routine (ISR) when an interrupt is accessed.

The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 616 may provide a common infrastructure that may be utilized by the applications 620 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 620 and other software components/modules.

The middleware layer 618 (also sometimes referred to as frameworks) may provide a higher-level common infrastructure that may be utilized by the applications 620 and/or other software components/modules. For example, the middleware layer 618 may provide various graphic user interface (GUI) functions, high-level resource management, high-level location services, and so forth. The middleware layer 618 may provide a broad spectrum of other APIs that may be utilized by the applications 620 and/or other software components/modules, some of which may be specific to a particular operating system or platform.

The applications 620 include built-in applications 640 and/or third-party applications 642. Examples of representative built-in applications 640 may include, but are not limited to, a contacts application, a browser application, a book reader application, a location application, a media application, a messaging application, and/or a game application. Third-party applications 642 may include any of the built-in applications 640 as well as a broad assortment of other applications. In a specific example, the third-party application 642 (e.g., an application developed using the Android™ or iOS™ software development kit (SDK) by an entity other than the vendor of the particular platform) may be mobile software running on a mobile operating system such as iOS™ Android™, Windows® Phone, or other mobile computing device operating systems. In this example, the third-party application 642 may invoke the API calls 624 provided by the mobile operating system such as operating system 614 to facilitate functionality described herein.

The applications 620 may utilize built-in operating system functions (e.g., kernel 628, services 630 and/or drivers 632), libraries (e.g., system 634, API libraries 636, and other libraries 638), and middleware layer 618 to create user interfaces to interact with users of the system. Alternatively, or additionally, in some systems interactions with a user may occur through a presentation layer, such as presentation layer 644. In these systems, the application/module "logic" can be separated from the aspects of the application/module that interact with a user.

Some software architectures utilize virtual machines. In the example of FIG. 6, this is illustrated by virtual machine 648. A virtual machine creates a software environment where applications/modules can execute as if they were executing on a hardware computing device. A virtual machine is hosted by a host operating system (operating system 614) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
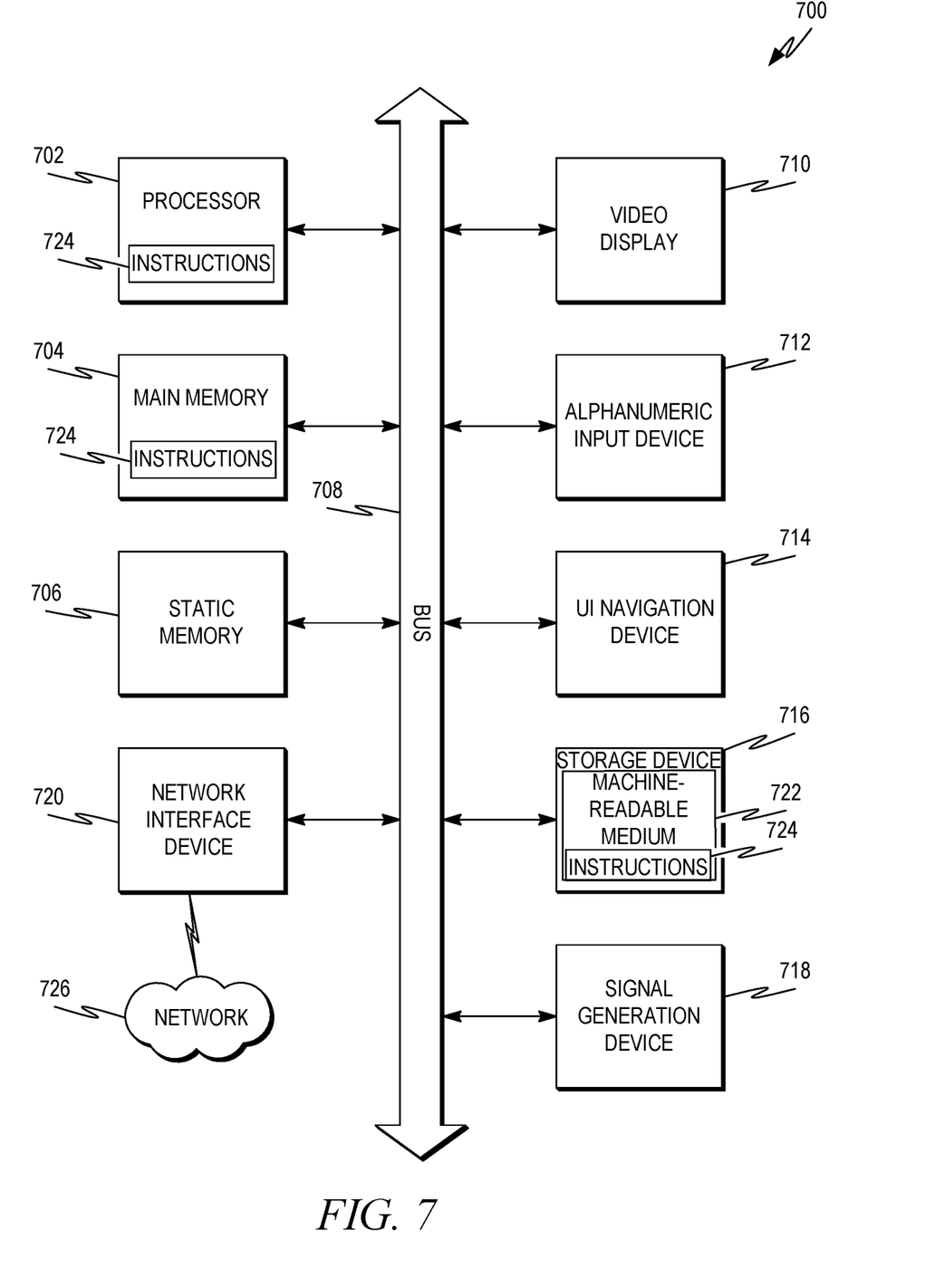
FIG. 7 is a block diagram of a machine in the example form of a computer system within which instructions may be executed for causing the machine to perform any one or more of the methodologies discussed herein.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704, and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (or cursor control) device 714 (e.g., a mouse), a disk drive unit 716, a signal generation device 718 (e.g., a speaker), and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, with the main memory 704 and the processor 702 also constituting machine-readable media 722.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An analytics computing system comprising:
   at least one processor programmed to perform operations comprising:
   receiving, from a user computing device, data describing a multi-resource operation, the multi-resource operation comprising a first action associated with a first remote resource and a second action associated with a second remote resource;
   executing a multi-resource application programming interface (API) service;
   accessing, by the multi-resource API service, security data associated with the first remote resource;
   sending an authorization message to an authorization server, the authorization message based at least in part on the security data associated with the first remote resource;
   receiving, from an authentication server, token data associated with the first remote resource;
   sending, by the multi-resource API service, a first trigger message to a public API of the first remote resource, the first trigger message describing the first action and comprising the token data;
   sending, to the first remote resource, first data, the first data being sent via the public API of the first remote resource;
   receiving, from the first remote resource, first result data describing a result of the first action performed at the first remote resource using the first data;
   initiating, by the multi-resource API service, a second connection with the second remote resource;
   sending, by the multi-resource API service, a second trigger message to a public API of the second remote resource, the second trigger message describing a second action; and
   sending, to the second remote resource, second data associated with the second action, the second data being sent via the public API of the second remote resource.

2. The analytics computing system of claim 1, the operations further comprising accessing, by the multi-resource API service, first connection data for the first remote resource, the first connection data comprising first address data describing an address of a public API of the first remote resource, and first security data, the sending of the first trigger message being based at least in part on the first connection data and the first security data.

3. The analytics computing system of claim 1, the operations further comprising:
   before sending the authorization message to the authorization server, sending, by the multi-resource API service, an initial trigger message to the public API of the first remote resource, the initial trigger message comprising a stored token data received with the security data; and
   receiving, from the public API of the first remote resource, a rejection message indicating that the stored token data is not accepted.

4. The analytics computing system of claim 1, the operations further comprising serving a user interface screen, by the analytics computing system and to the user computing device, the user interface screen comprising at least one result field and a multi-resource operation input, the multi-resource operation input being selectable by a user to instruct the analytics computing system to execute the multi-resource operation.

5. The analytics computing system of claim 4, the operations further comprising:
receiving an indication that a user associated with the user computing device has selected the multi-resource operation input;
serving, to the user computing device, a multi-action operation configuration screen, the multi-action operation configuration screen comprising at least one input field for receiving multi-action operation description data from the user; and
receiving, from the user computing device, the multi-action operation description data via the at least one input field, at least one of the first action and the second action being based at least in part on the multi-action operation description data.

6. The analytics computing system of claim 1, the first remote resource comprising a calculation engine and the first action comprising an operation performed on the first data using the calculation engine.

7. The analytics computing system of claim 1, the second action comprising storing the second data at the second remote resource.

8. The analytics computing system of claim 1, the sending of the first data to the first remote resource comprising calling, by the multi-resource API service, a data export API executing at the analytics computing system, the data export API to send the first data to the first remote resource via the public API of the first remote resource.

9. A method for interfacing an analytics computing system with a remote resource, the method comprising:
receiving, by the analytics computing system and from a user computing device, data describing a multi-resource operation, the multi-resource operation comprising a first action associated with a first remote resource and a second action associated with a second remote resource;
executing, by the analytics computing system, a multi-resource application programming interface (API) service;
accessing, by the multi-resource API service, security data associated with the first remote resource;
sending an authorization message to an authorization server, the authorization message based at least in part on the security data associated with the first remote resource;
receiving, from an authentication server, token data associated with the first remote resource;
sending, by the multi-resource API service, a first trigger message to a public API of the first remote resource, the first trigger message describing the first action and comprising the token data;
sending, by the analytics computing system and to the first remote resource, first data, the first data being sent via the public API of the first remote resource;
receiving, by the analytics computing system and from the first remote resource, first result data describing a result of the first action performed at the first remote resource using the first data;
initiating, by the multi-resource API service, a second connection with the second remote resource;
sending, by the multi-resource API service, a second trigger message to a public API of the second remote resource, the second trigger message describing a second action; and
sending, by the analytics computing system and to the second remote resource, second data associated with the second action, the second data being sent via the public API of the second remote resource.

10. The method of claim 9, the operations further comprising accessing, by the multi-resource API service, first connection data for the first remote resource, the first connection data comprising first address data describing an address of a public API of the first remote resource, and first security data, the sending of the first trigger message being based at least in part on the first connection data and the first security data.

11. The method of claim 9, further comprising:
before sending the authorization message to the authorization server, sending, by the multi-resource API service, an initial trigger message to the public API of the first remote resource, the initial trigger message comprising a stored token data received with the security data; and
receiving, from the public API of the first remote resource, a rejection message indicating that the stored token data is not accepted.

12. The method of claim 9, further comprising serving a user interface screen, by the analytics computing system and to the user computing device, the user interface screen comprising at least one result field and a multi-resource operation input, the multi-resource operation input being selectable by a user to instruct the analytics computing system to execute the multi-resource operation.

13. The method of claim 12, further comprising:
receiving, by the analytics computing system, an indication that a user associated with the user computing device has selected the multi-resource operation input;
serving, by the analytics computing system and to the user computing device, a multi-action operation configuration screen, the multi-action operation configuration screen comprising at least one input field for receiving multi-action operation description data from the user; and
receiving, by the analytics computing system and from the user computing device, the multi-action operation description data via the at least one input field, at least one of the first action and the second action being based at least in part on the multi-action operation description data.

14. The method of claim 9, the first remote resource comprising a calculation engine and the first action comprising an operation performed on the first data using the calculation engine.

15. The method of claim 9, the second action comprising storing the second data at the second remote resource.

16. The method of claim 9, the sending of the first data to the first remote resource comprising calling, by the multi-resource API service, a data export API executing at the analytics computing system, the data export API to send the first data to the first remote resource via the public API of the first remote resource.

17. A non-transitory machine-readable medium comprising instructions thereon that, when executed by at least one processor, cause the at least one processor to perform operations comprising:

receiving, from a user computing device, data describing a multi-resource operation, the multi-resource operation comprising a first action associated with a first remote resource and a second action associated with a second remote resource;

executing a multi-resource application programming interface (API) service;

accessing, by the multi-resource API service, security data associated with the first remote resource;

sending an authorization message to an authorization server, the authorization message based at least in part on the security data associated with the first remote resource;

receiving, from an authentication server, token data associated with the first remote resource;

sending, by the multi-resource API service, a first trigger message to a public API of the first remote resource, the first trigger message describing the first action and comprising the token data;

sending, to the first remote resource, first data, the first data being sent via the public API of the first remote resource;

receiving, from the first remote resource, first result data describing a result of the first action performed at the first remote resource using the first data;

initiating, by the multi-resource API service, a second connection with the second remote resource;

sending, by the multi-resource API service, a second trigger message to a public API of the second remote resource, the second trigger message describing a second action; and sending, to the second remote resource, second data associated with the second action, the second data being sent via the public API of the second remote resource.

18. The non-transitory machine-readable medium of claim 17, the operations further comprising accessing, by the multi-resource API service, first connection data for the first remote resource, the first connection data comprising first address data describing an address of a public API of the first remote resource, and first security data, the sending of the first trigger message being based at least in part on the first connection data and the first security data.

* * * * *